United States Patent [19]

Lange et al.

[11] Patent Number: 4,493,004

[45] Date of Patent: Jan. 8, 1985

[54] SURGE ARRESTER WITH A GAS-FILLED HOUSING

[75] Inventors: Gerhard Lange; Jürgen Boy, both of Berlin, Fed. Rep. of Germany

[73] Assignee: Siemens Aktiengesellschaft, Berlin and Munich, Fed. Rep. of Germany

[21] Appl. No.: 470,709

[22] Filed: Feb. 28, 1983

[30] Foreign Application Priority Data

Mar. 3, 1982 [DE] Fed. Rep. of Germany ....... 3207663

[51] Int. Cl.[3] .............................................. H02H 9/06

[52] U.S. Cl. .................................... 361/120; 361/129; 313/581; 313/620; 313/596; 313/355

[58] Field of Search .............. 361/120, 129, 117, 119; 313/231.11, 355, 581, 596, 620

[56] References Cited

U.S. PATENT DOCUMENTS

| | | | |
|---|---|---|---|
| 3,818,259 | 6/1974 | Jensen | 361/120 X |
| 4,037,266 | 7/1977 | English et al. | 361/120 |
| 4,084,208 | 4/1978 | Bazarian et al. | 361/129 X |
| 4,266,260 | 5/1981 | Lange et al. | 361/129 |
| 4,283,747 | 8/1981 | Perkins, Jr. | 361/120 |

FOREIGN PATENT DOCUMENTS

| | | |
|---|---|---|
| 2310960 | 10/1979 | Fed. Rep. of Germany . |
| 2828650 | 1/1980 | Fed. Rep. of Germany . |

*Primary Examiner*—Patrick R. Salce

*Attorney, Agent, or Firm*—Herbert L. Lerner; Laurence A. Greenberg

[57] ABSTRACT

A surge arrester, includes a gas-filled housing, copper electrodes disposed opposite each other in the housing, the electrodes each including a relatively thin-walled truncated conical part having a flange integral therewith and a solid cylindrical part, the cylindrical parts each having a respective end surface facing each other, the end surfaces being mutually spaced apart by a given distance and each having a trough-shaped axially-symmetrical depression formed therein, a highly active electrode activating compound filling each of the depressions, a tubular ceramic insulator at least partly surrounding the electrodes defining respective annular gaps between the insulator and each of the cylindrical parts having widths being substantially between 0.2 mm and 0.4 mm, the gaps including rear spaces being low in vapor depositions, the insulator having end surfaces being vacuum-tightly hard soldered to the flanges, and at least one ignition line disposed on the insulator and respectively projecting into each of the gaps and into the rear spaces by at least 1.5 mm, the given distance between the end surfaces of the cylindrical parts being at most 3.5 times the width of one of the gaps in vicinity of the at least one ignition line, the electrodes defining a discharge space including the gaps having a volume of at least 20 $mm^3$.

3 Claims, 1 Drawing Figure

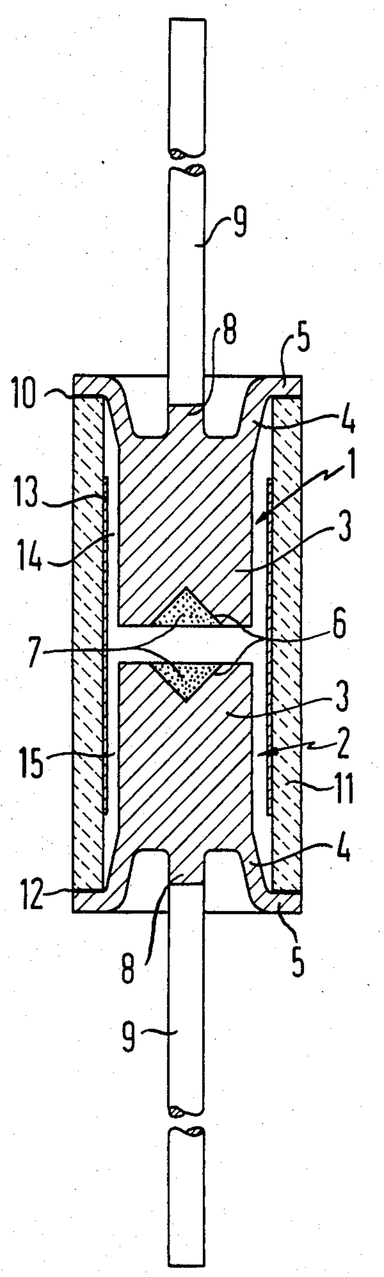
9
8
5
10
4
1
13
3
14
6
7
3
2
15
11
4
12
5
8
9

SURGE ARRESTER WITH A GAS-FILLED HOUSING

The invention relates to a surge arrester with a gas-filled housing in which copper electrodes are spaced from each other by a tubular insulator and are disposed opposite each other, each electrode including a part shaped as a truncated cone with a small wall thickness having a flange fastened to one end face of the insulator in a vacuum-tight manner and a cylindrical part formed of solid material, the opposing faces of the electrodes having an axially-symmetrical depression in which an electrode-activating compound is anchored, and one or more ignition lines or stripes being disposed on the insulator and closely coupled to the electrodes.

Such a surge arrester is known from German Published, Non-Prosecuted Application DE-OS No. 28 28 650, corresponding to U.S. Pat. No. 4,266,260. It is known from German Published, Prosecuted Application DE-AS No. 23 10 960, corresponding to U.S. Pat. No. 3,818,259, to provide a wedge-shaped gap in a surge arrester, between each electrode and the inside wall of the insulating body, which has a length of at least 1 mm and a width of at most 0.15 mm and due to this construction forms a rear space with little vapor deposition. This is because the pressure wave which is generated in the case of breakdowns with large currents, compresses the gas volume in the gap and thereby largely prevents evaporating material from penetrating into the rear space of the gap.

Known surge arresters have a minimum diameter of about 5 mm, even for a "light duty" class rating. The life expectancy for such surge arresters, which have been made more stringent in recent times, are not met by such surge arresters.

It is accordingly an object of the invention to provide a surge arrester with a gas-filled housing, which overcomes the hereinafore-mentioned disadvantages of the heretofore-known devices of this general type, and to reduce the outside diameter of a surge arrester to less than 4 mm in order to achieve a higher packing density of surge arresters, to simultaneously increase the life expectancy of the surge arrester and to at least maintain the other characteristics.

With the foregoing and other objects in view there is provided, in accordance with the invention, a surge arrester, comprising a gas-filled housing, copper electrodes disposed opposite each other in the housing, the electrodes each including a relatively thin-walled truncated conical part having a flange integral therewith and a solid cylindrical part, the cylindrical parts each having a respective end surface facing each other, the end surfaces being mutually spaced apart by a given distance and each having a trough-shaped axially-symmetrical depression formed therein, a highly active electrode activating compound filling each of the depressions, a tubular ceramic insulator at least partly surrounding the electrodes defining respective annular gaps between the insulator and each of the cylindrical parts having widths being substantially between 0.2 mm and 0.4 mm, the gaps including rear spaces being low in vapor deposition, the insulator having end surfaces being vacuum-tightly hard soldered to the flanges, and at least one ignition line being disposed on the insulator, closely coupled to the electrodes, and respectively projecting into each of the gaps and into the rear spaces by at least 1.5 mm, the given distance between the end surfaces of the cylindrical parts being at most 3.5 times the width of one of the gaps in vicinity of the at least one ignition line, the electrodes defining a discharge space including the gaps having a volume of at least 20 $mm^3$.

The structure according to the invention simultaneously prevents melting and bursting of the surge arrester and ensures a long service life.

The very small minimum value for the gas discharge space of only 20 $mm^3$ is attainable only in conjunction with the given specific shape and the materials for the electrodes and the housing. The rear space with little vapor deposition in the gaps ensures a sufficiently low insulating gap between the ignition stripes or lines and the electrodes. For reliable operation, however, it is also necessary that the ignition stripes extend into the rear space with low vapor deposition, since after a vapor deposition, the peaks of the electric field are eliminated, and therefore the auxiliary discharge through the ignition stripes, which is necessary for firing in the case of rapidly rising voltages, is made more difficult. On the other hand, the gap between the wall and the electrode must be as small as possible so that the electrodes can be made with a relatively large diameter. This is necessary so that the electrodes do not melt during the discharge but store the heat produced and finally can give it off. This small gap width in turn is only possible if a highly active electrode activation compound is used. Known compounds, such as a mixture of potassium halogenide and a barium-aluminum alloy are particularly suitable for this purpose. This highly active electrode activating mass is accomodated in an axial-symmetrical depression, so that on the one hand the compound cannot be blown away during the discharge and so that, on the other hand, the arc travels during the discharge without its base making the electrodes melt at one point. The above-mentioned electrode activating compound, however, also ensures that in relatively narrow gaps, the main discharge takes place between the end faces of the electrodes, but not by way of the firing stripes. The housing made of ceramic material, the construction of the electrode flange and the hard-solder, yield a very pressure proof and thermally stable structure.

The invention is based on the insight that the above-mentioned features interact and thereby permit a size reduction of the arrester.

In accordance with another feature of the invention, each of the respective gaps is at least 2.5 mm long per electrode. With the gap length for each electrode of at least 2.5 mm, the presently customary requirements as to the dielectric strength are already ensured.

In accordance with a concomitant feature of the invention, each of the gaps has a width of 0.3 mm and a length of 3.7 mm, each of the electrodes has a diameter of 2.2 mm, the given distance between the end faces of the cylindrical parts is 0.6 mm, the ignition lines are insulated from and disposed symmetrically relative to the electrodes, and the ignition lines respectively extend substantially 2.4 mm into the gaps. With such a structure, the requirements for a surge arrester for 5 A/sec and 2.5 kA of CCITT standard 8/20 $\mu s$ are met with the margin of safety.

Other features which are considered as characteristic for the invention are set forth in the appended claims.

Although the invention is illustrated and described herein as embodied in a surge arrester with a gas-filled housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of the drawing, which is a surge arrester according to the invention shown in a diagrammatic cross-sectional view on a scale of 10:1.

Referring now to the drawing in detail, it is seen that two electrodes 1 and 2 each have a cylindrical part 3 and a part 4 in the shape of a truncated cone. The part 4, in the shape of a truncated cone, is constructed with thin walls and is integrally connected to a flange 5. The flange 5 is hard-soldered at respective end faces 10, 12 thereof to an end face of a ceramic tube 11. The electrodes 1, 2 have end faces which face each other, that are provided with axial-symmetrical depressions 6 which are filled with a highly active electrode-activating compound 7. In the conical part thereof, the electrodes each have a terminal post 8 which does not extend beyond the conical part. A lead 9 is butt-welded or welded on to this terminal post 8. If the surge arresters are to be inserted into a mounting, the welded-on lead wire can be omitted. In this case, a mounting can rest against the flanges 5. The terminal post 8 does not interfere since it does not extend beyond the conical part of the electrodes. Ignition stripes or lines 13 which are disposed in such a way as to be electrically insulated from both electrodes, extend into rear spaces which are low in vapor deposition, of gaps 14 and 15 between the electrodes 1, 2 and the ceramic tube 11.

The gaps 14 and 15 have a width of about 0.3 mm. The rear spaces of the gaps 14, 15 with low vapor deposition begin approximately at a distance of 1.5 mm from the end face of the respective electrode. The firing or ignition stripes or lines 13 extend about 2.4 mm into the gaps 14, 15. The total length of the gaps 14, 15 including a wedge-shaped portion in the region of the part of these gaps with the truncated-cone shape, is about 3.7 mm. The diameter of the cylindrical part 3 of the electrodes 1, 2 is 2.2 mm; the distance between the end faces of the electrodes 1,2 is 0.6 mm. If a highly active electrode-activating compound 7 is used, the embodiment shown in the drawing meets the requirements of a surge arrester for 5 A/sec and 2.5 kA according to the International Standard CCITT 8/20. The wall thickness of the ceramic tube which is only 0.5 mm provides the necessary strength for the surge arrester in conjunction with the highly temperature-resistant hard solder. The pressure wave which occurs, particularly during a test with 2.5 kA, is absorbed due to the shape of the discharge space and the gaps, without leading to a breakage of the surge arrester.

The ignition stripe 13 is advantageously provided in the form of a graphite stripe.

The terminal post 8 can be omitted if no lead is to be welded on.

With a diameter of the trough-like depression 6 of 1 mm, a sufficiently wide copper rim of 0.6 mm width remains for the base of the arc.

The dimensions given herein allow relatively uncritical manufacturing tolerances. In particular, ceramic tubes with the customary tolerance can be used; they need not be ground to diameter. A further advantage of the structure according to the invention is the very small electric capacity of the apparatus which is achieved by the small electrode diameter. In this way, such arresters can be used in circuits with a high operating frequency without resulting in an undesirable damping of the frequencies.

The foregoing is a description corresponding to German application No. P 32 07 663.0, filed Mar. 3, 1982, the International priority of which is being claimed for the instant application and which is hereby made part of this application. Any discrepancies between the foregoing specification and the aforementioned corresponding German application are to be resolved in favor of the latter.

We claim:

1. Surge arrester, comprising a gas-filled housing, copper electrodes disposed opposite each other in said housing, said electrodes each including a relatively thin-walled truncated conical part having a flange integral therewith and a solid cylindrical part, said cylindrical parts each having a respective end surface facing each other, said end surfaces being mutually spaced apart by a given distance and each having a trough-shaped axially-symmetrical depression formed therein, a highly active electrode activating compound filling each of said depressions, a tubular ceramic insulator at least partly surrounding said electrodes, said ceramic insulator and said electrodes defining respective annular gaps between said insulator and each of said cylindrical parts, said gaps having widths being substantially between 0.2 mm and 0.4 mm, said gaps including rear spaces being low in vapor deposition, said insulator having end surfaces being vacuum-tightly hard soldered to said flanges, and at least one ignition line being disposed on said insulator and respectively projecting into each of said gaps and into said rear spaces, said ignition lines projecting into each of said gaps by at least 1.5 mm measured from said end faces of said cylindrical parts, said given distance between said end surfaces of said cylindrical parts being at most 3.5 times the width of one of said gaps, as said widths of said gaps are measured in vicinity of said at least one ignition line, said electrodes defining a discharge space including said gaps having a volume of at least 20 $mm^3$.

2. Surge arrester according to claim 1, wherein each of said respective gaps is at least 2.5 mm long.

3. Surge arrester according to claim 1, wherein each of said gaps has a width of 0.3 mm and a length of 3.7 mm, each of said electrodes has a diameter of 2.2 mm, said given distance between said end faces of said cylindrical parts is 0.6 mm, said ignition lines are insulated from and disposed symmetrically relative to said electrodes, and said ignition lines respectively extend substantially 2.4 mm into said gaps.

* * * * *